United States Patent [19]

Hore

[11] Patent Number: 5,214,378
[45] Date of Patent: May 25, 1993

[54] HOMOPOLAR INDUCTIVE DISPLACEMENT SENSOR

[75] Inventor: Donald L. Hore, Sneyd Park, United Kingdom

[73] Assignee: Radiodetection Limited, United Kingdom

[21] Appl. No.: 679,026

[22] PCT Filed: Oct. 11, 1989

[86] PCT No.: PCT/GB89/01198
§ 371 Date: May 8, 1991
§ 102(e) Date: May 8, 1991

[87] PCT Pub. No.: WO90/04152
PCT Pub. Date: Apr. 19, 1990

[30] Foreign Application Priority Data

Oct. 11, 1988 [GB] United Kingdom ............... 8823836
Jul. 21, 1989 [GB] United Kingdom ............... 8916749

[51] Int. Cl.⁵ .................... G01B 7/14; G01B 7/30; G01D 5/20
[52] U.S. Cl. ................. 324/207.23; 324/207.16; 324/207.17; 324/207.24; 324/207.25; 310/168; 340/870.31
[58] Field of Search ............ 324/207.16, 207.17, 324/207.18, 207.19, 207.23, 207.24, 207.25; 310/102 A, 68 B, 155, 168, 178; 340/870.31, 870.32, 870.33; 336/118, 135

[56] References Cited

U.S. PATENT DOCUMENTS

| | | |
|---|---|---|
| 3,045,227 | 7/1962 | Minas . |
| 3,205,384 | 9/1965 | Sears ............................. 310/168 |
| 4,013,911 | 3/1977 | Fujiwara et al. ............ 310/168 X |
| 4,587,741 | 5/1986 | Rorden et al. . |
| 4,743,786 | 5/1988 | Ichikawa et al. ......... 324/207.25 X |
| 4,755,751 | 7/1988 | Ray ............................ 324/207.25 X |
| 4,870,358 | 9/1989 | Glaize et al. .............. 324/207.25 X |
| 4,991,301 | 2/1991 | Hore .......................... 324/207.25 X |
| 5,027,067 | 6/1991 | Witzig et al. ............. 324/207.25 X |

FOREIGN PATENT DOCUMENTS

86/07145 12/1986 World Int. Prop. O. .
88/06716 9/1988 World Int. Prop. O. .

Primary Examiner—Gerard R. Strecker
Attorney, Agent, or Firm—Larson and Taylor

[57] ABSTRACT

Displacement along a linear or rotary path causes relative displacement of a pair of elements (101,102) that confront each other across the path. One element (101) provides a series of coil portions (AB,BC), while the other (102) has a portion which increases the inductance of the fraction of the coil portions that it lies adjacent at any instant. The coil portions are homopolar. Typically each coil portion has an axis which intersects the path, and all are wound in the same sense about their axes. They are generally connected in series as a single winding on a core (101). The core has unwound portions (104) for providing a flux return path.

17 Claims, 5 Drawing Sheets

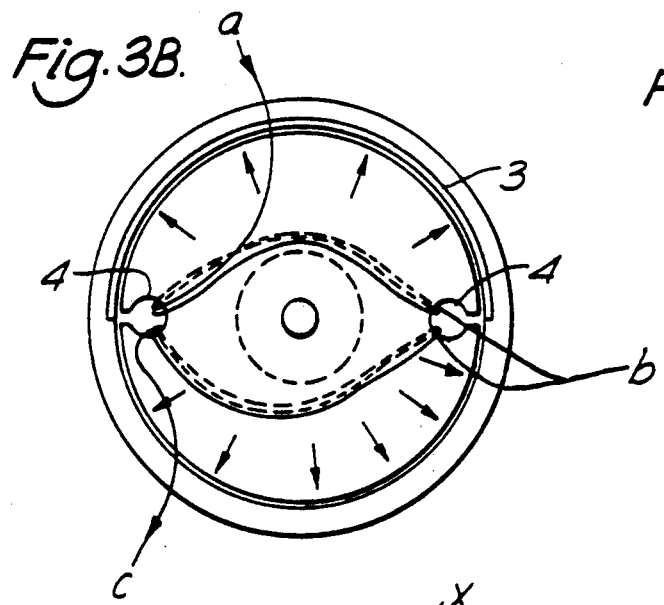
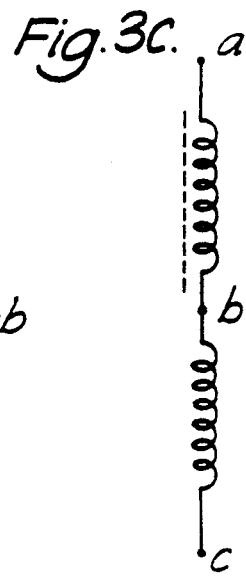
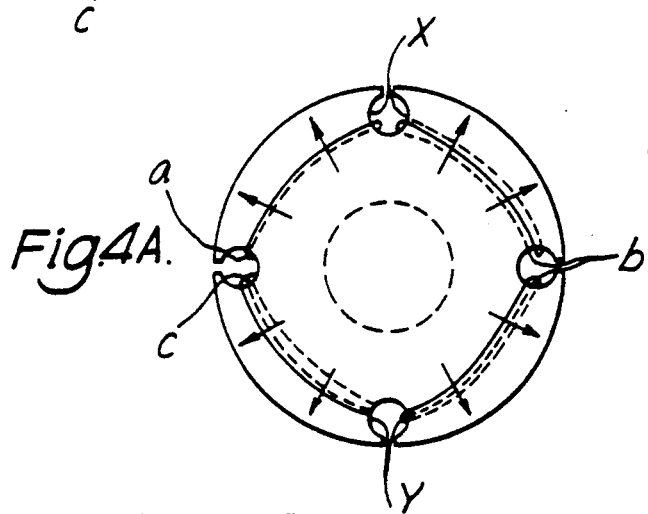
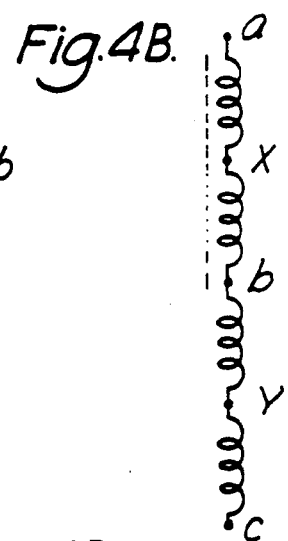
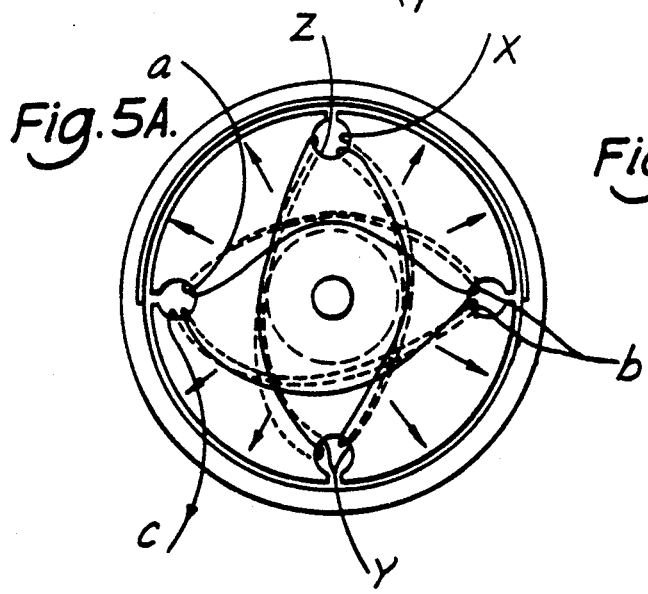
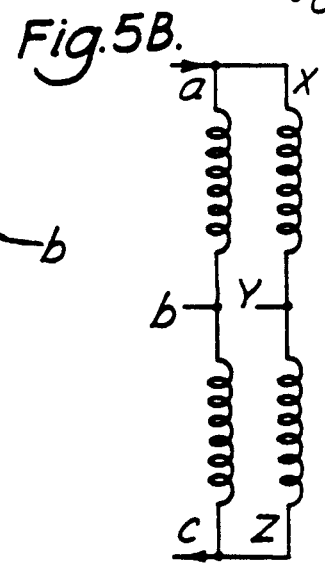

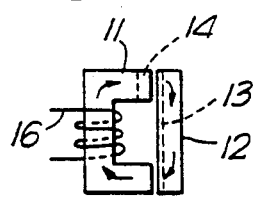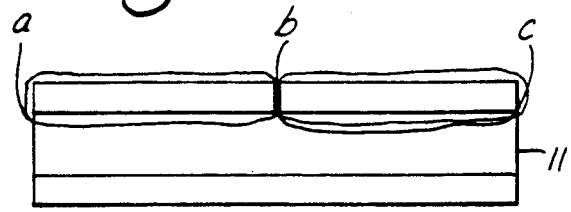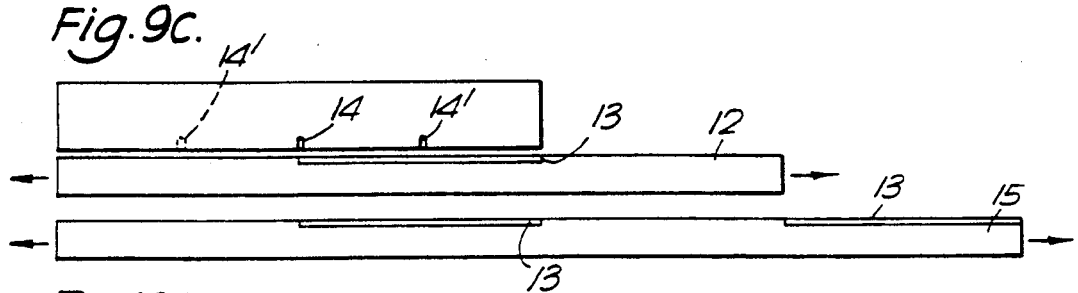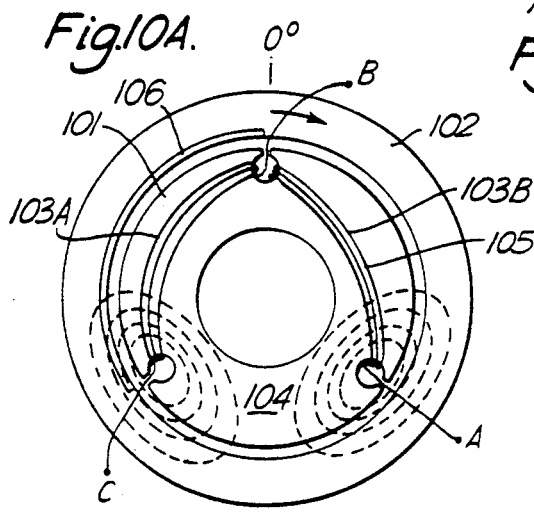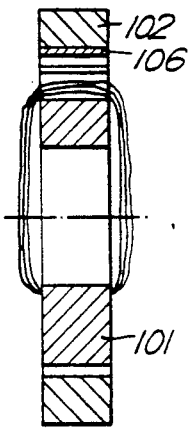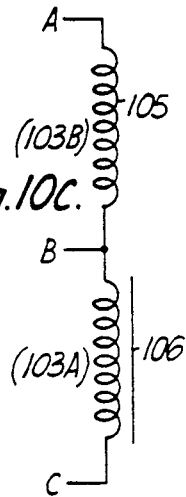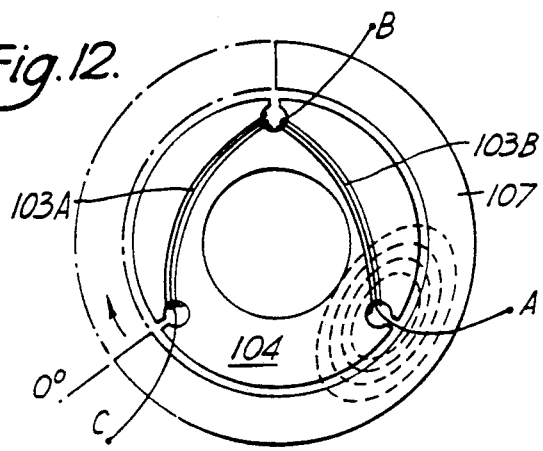

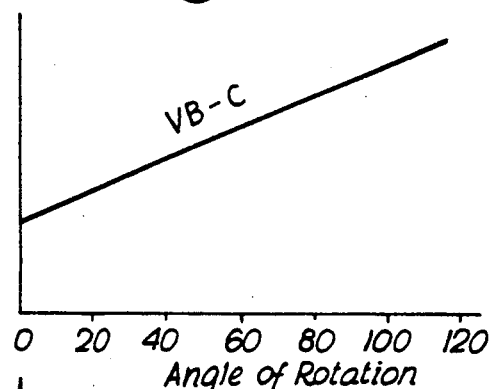
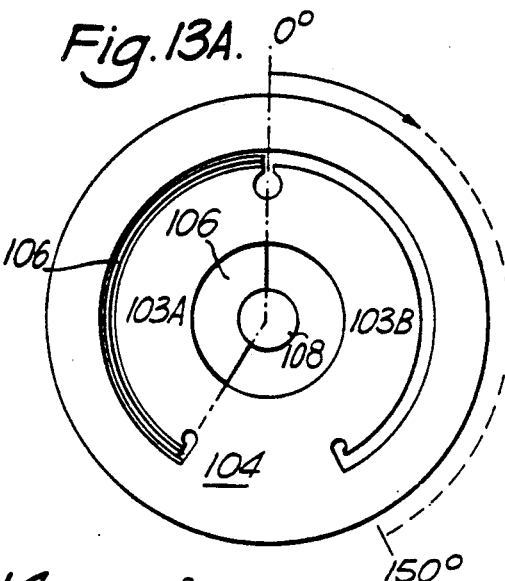
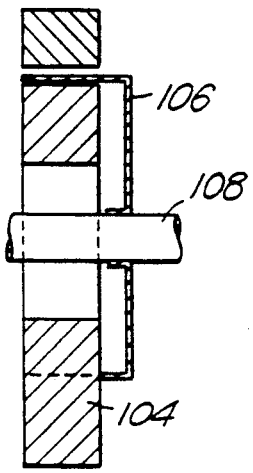
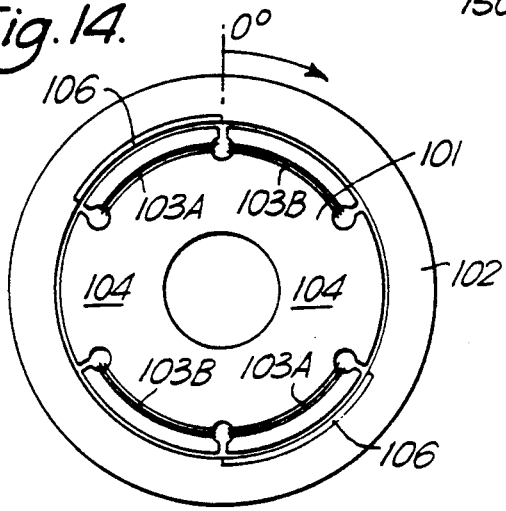
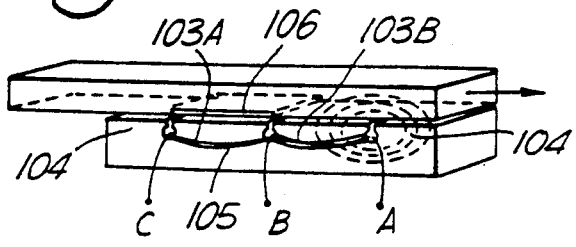
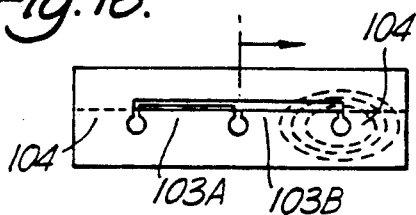
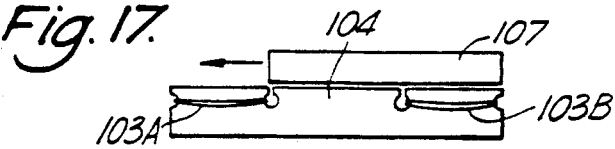

HOMOPOLAR INDUCTIVE DISPLACEMENT SENSOR

TECHNICAL FIELD

This invention relates to homopolar inductive displacement sensors which enable the angular displacement of a shaft or linear displacement of an element to be converted into an a.c. analogue voltage.

BACKGROUND ART

Inductive sensors having a plurality of wound poles arranged along a displacement path are described in WO 88/06716, but they are of heteropolar construction. The direction of flux at any given moment between stator and rotor alternates between successive wound poles. For example, FIGS. 1 and 2 (which correspond to FIGS. 6 and 7 of WO 88/06716) show a similar pair of devices each comprising an annular stator 21 having twelve salient poles (k to v) bearing windings of alternating polarity and extending radially inwardly towards a rotor 22. This rotor has two 180° portions of different effective permeability, either because they are sections 23,24 of different materials (FIG. 2) or because one section has a screening layer of a nonmagnetic conductor (FIG. 1). In each case, the windings on the poles confronting one section 23 have higher reactances than the windings on the other poles. As the rotor turns, each pole winding experiences a change in reactance as it is passed by the interface between the rotor sections. Thus measured voltage drops change with rotation in a stepwise fashion, or smoothly if the stator slots are skewed relative to the rotor interfaces between sections 23,24 or vice versa. Monitoring analogue voltages across orthogonal pairs of taps (AC and BD) allows a plus or minus 180° analogue signal representative of rotor angle to be derived.

DISCLOSURE OF THE INVENTION

In contrast, the present invention provides a homopolar inductive device for providing a signal relating to relative angular displacement. That is, there are a plurality of wound poles arranged along a displacement path, with successive poles in a homopolar relationship. Generally a device according to the invention has its poles provided by a single winding which has one or more intermediate taps by which it is divided into a plurality of serially connected coil portions. The invention makes available a method of operating such a device to obtain such a signal.

It should be noted here that a heteropolar device is one in which the direction of flux alternates between adjacent wound poles, as mentioned above. In a homopolar device, the flux direction is the same between adjacent wound poles. This is true irrespective of the return path of the flux. Thus, the homopolar arrangement can be considered to be a single divided pole.

The invention provides an inductive displacement sensor for providing electrical output data relating to displacement along a path, said sensor comprising first and second elements, which extend along the path on respective sides and confront each other across said path; said first element having a plurality of coil portions (ab,bc) disposed along the path and oriented so that their axes of polarity cross the path to the other side; said second element comprising inductance affecting means adapted to affect the inductance of an adjacent coil portion and arranged so that at any given time, only a fraction of the coil portions of the first element are affected thereby; and wherein said inductance affecting means is displaceable relative to said first element, said relative displacement effectively displacing a region of affected inductance so that it applies to a spatially varying fraction of the coil portions (ab,bc); characterised in that said coil portions (ab,bc) are connected as a homopolar series so that when current is passed through said series so that any one coil portion is polarised N-S from the path side of the first element to the other path side, all of the coil portions have this polarity; and when any one coil portion is polarised S-N, all of the coil portions have this polarity. The second element may be a ferromagnetic element that is always adjacent all of the core portions but bears a screen which screens it from at least one, but not all, coil portions.

Alternatively the second element may not extend adjacent all of the coil portions, so that displacement alters the coil portions(s) which it lies adjacent.

In a heteropolar device the output characteristic thereof, i.e., a curve or graph representing the electrical output characteristic thereof, is notched, due to the gaps between the wound poles, and therefore the moving element (e.g. the rotor) has to be skewed to eliminate this notching. This results in a rounding of the characteristic at its transition points and therefore restricts the linear range available. A homopolar device does not suffer from this defect.

In one type of embodiment, the return path for the flux is along the length of the stator. In rotary embodiments, this is suitable for sensing angles up to plus or minus 180°, with only two coils being required (there being many applications where angles less than 180° are of primary interest).

In a second type of embodiment, coil portions are disposed along only part of the first element, and the rest of it provides a flux return path.

Some embodiments of the invention will now be described in greater detail with reference to the accompanying drawings.

BRIEF DESCRIPTION OF DRAWINGS

FIG. 3B is an end elevation of the first embodiment;

FIG. 3C is a schematic diagram of the coils and the screen in the first embodiment;

FIG. 4A and FIG. 4B are views similar to FIGS. 3B and FIG. 3C but showing a second embodiment employing four 90° coils;

FIGS. 5A and 5B are views similar to FIGS. 4A and 4B but showing another arrangement of four coils;

FIGS. 9A, 9B and 9C depict a linear embodiment; FIG. 9A being an end elevation; FIG. 9B being a side elevation of a stator; and FIG. 9C being a top plan view showing two alternative moving elements;

FIGS. 10A and 10B are an end elevation and an axial section of a rotary embodiment for limited angles, and FIG. 10C is a schematic view of the coils and screen of this embodiment;

FIG. 11 is a graph for illustrating the operation of the FIG. 10 embodiment;

FIG. 12 is a view similar to FIG. 10A showing a modified embodiment;

FIGS. 13A and 13B are views similar to FIGS. 10A and 10B showing a further modified embodiment;

FIG. 14 is a view similar to FIG. 10A showing yet a further modified embodiment; and FIGS. 15-17 are side views of linear embodiments analogous to the limited angle rotary embodiments.

MODES FOR CARRYING OUT THE INVENTION

Figure 1:
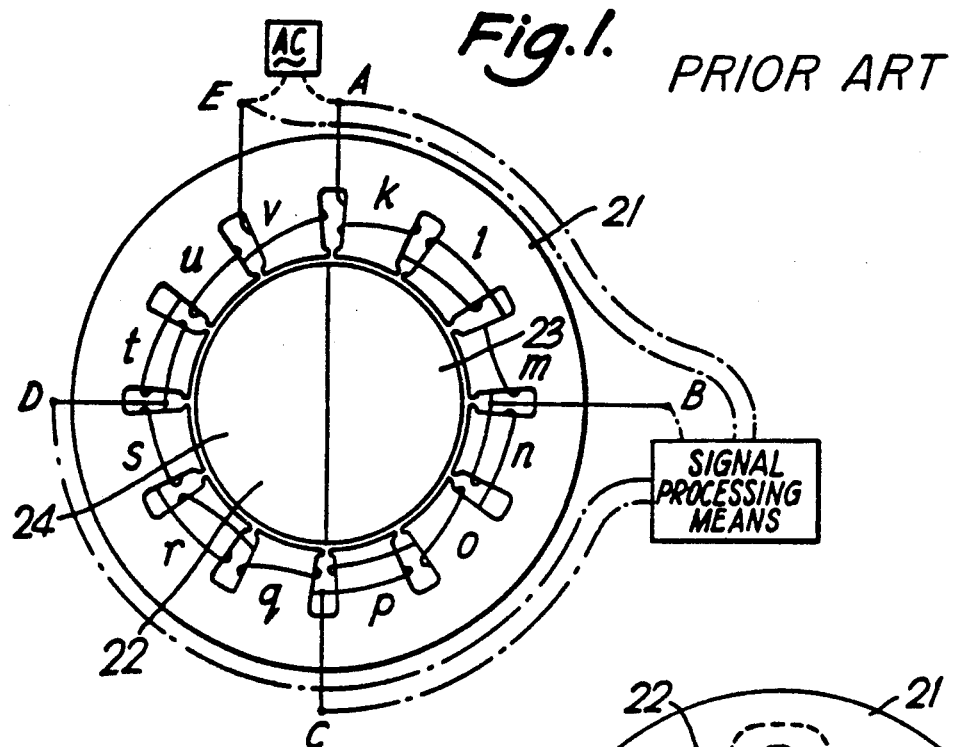
FIGS. 1 and 2 show embodiments of Prior Art inductive displacement sensors.
Figure 2:
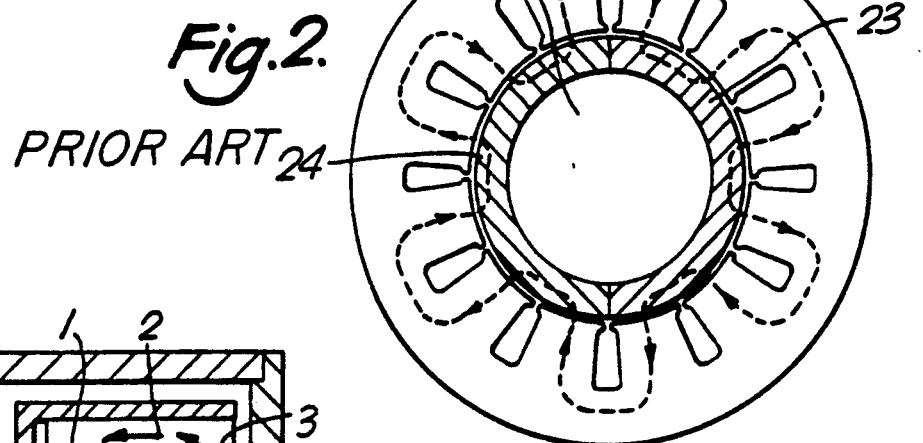
Figure 3A:
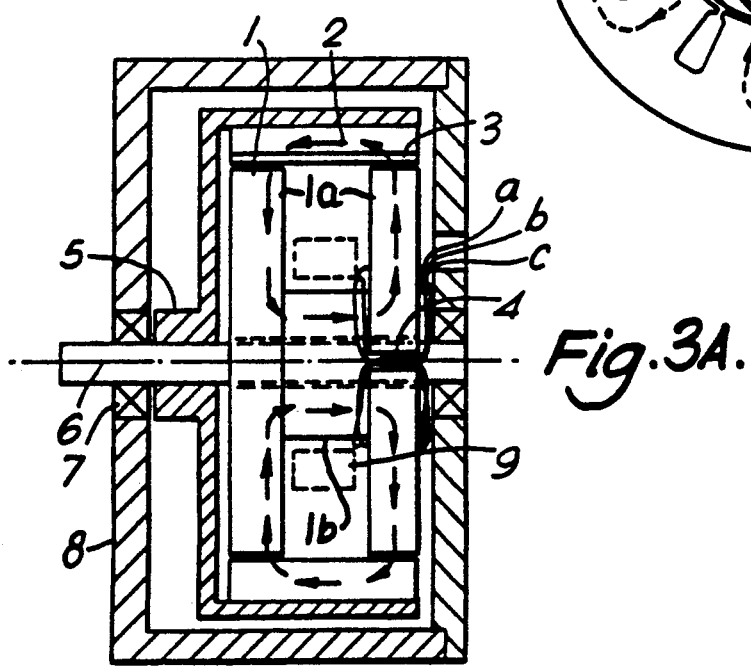
FIG. 3A is an axial section through a first embodiment of the invention having a rotor radially surrounding a stator employing two 180° coils.

FIGS. 3A to 3C show an example of the first type of embodiment, with an internal stator and an external rotor. The magnetic circuit comprises a stator 1 and a cylindrical annular rotor 2. The stator 1 is spool-shaped, having large-diameter axial end portions 1a and a reduced diameter intermediate portion 1b. The stator 1 comprises ferrite or material of similar magnetic properties, and the cylindrical annular rotor 2 is of the same ferromagnetic material, but having half its internal circumference screened by a conducting layer, e.g. of copper or aluminium 3. The spool 1 has two diametrically opposite slots 4 cut in one end portion 1a. Through these slots are wound two coils of 180° span, connected so that the magnetic flux for a given polarity of supply will flow outward from stator to rotor, returning via the air gap at the other end of the spool as indicated by the arrows. In the elevation shown in FIG. 3B, only the magnetic circuit elements are illustrated, and it can be seen that the upper half of the stator is embraced by coils between terminals a and b, and the lower half by coils between terminals b and c. When an a.c. supply is connected to a and c, the voltage drop between a and b will be lower than between b and c, because the short-circuiting effect of the screen 3 reduces the inductance of the upper section. Turning the rotor through 180° will reverse the situation, so that the voltage between the centre tap b and either a or c will display a basically linear analogue of angular displacement over 180°.

FIG. 3A shows how the rotor can be supported in a housing 5 coupled to a shaft 6 journalled in suitable bearings 7 in an enclosing housing 8, to form a practical shaft position transducer.

Figure 7:
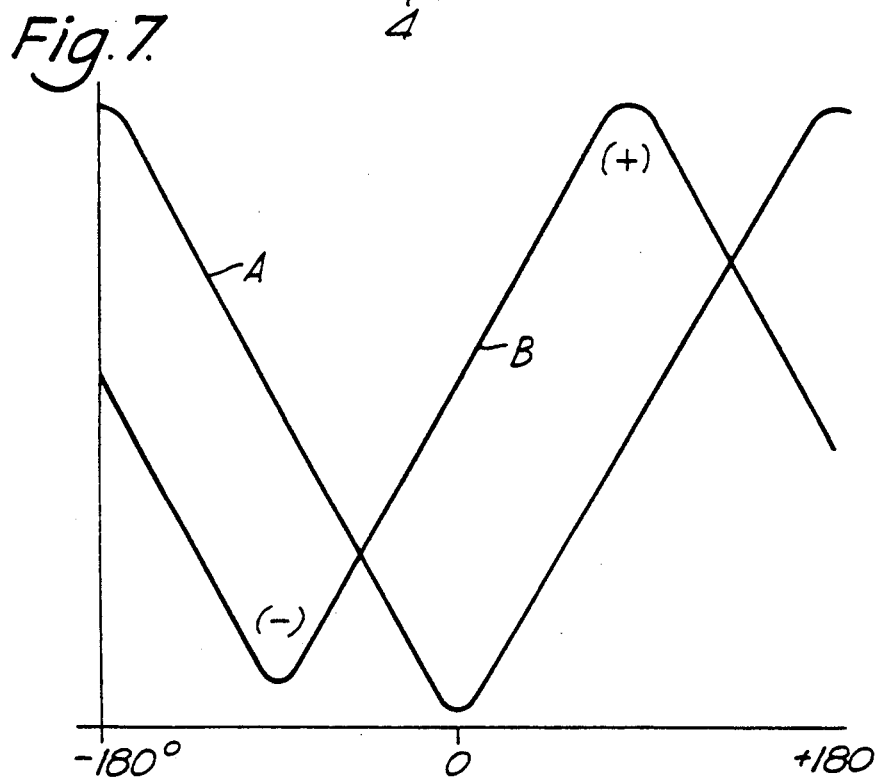
FIG. 7 is a graph for explaining the operation of the FIG. 4 embodiment.

To determine which 180° traverse is represented by the analogue voltage level, it is necessary to derive a second 180° analogue displaced by 90° from the first. This can be achieved by providing four winding slots at 90° instead of two at 180°, and winding four 90° poles in place of two 180° as shown in FIGS. 4A and 4B. Again the direction of flux produced is maintained constant around the circumference; the winding is centre-tapped at 180° as before but the connections are also brought out as taps X and Y at the 90° and 270° positions. The analogue output across taps X and Y will then be similar to that between centre tap b and either supply terminal, but displaced by 90°. The result is the two curves typified by FIG. 7, curve A representing the centre tap voltage and curve B the X-Y voltage. This can be converted to a simple plus or minus logic signal by determining whether it is high or low relative to an intermediate point, thus giving full 360° data. An alternative is shown in FIGS. 5A and 5B which is generally similar to the FIG. 3 embodiment, but the pair of 180° span coils of FIG. 3 a-b-c are duplicated by coils X-Y-Z at 90°. Each pair can be connected across the supply to provide a pair of auto-transformers in parallel, with a common magnetic circuit and common supply rails. An advantage here over the FIG. 4A arrangement is that both analogue outputs are derived with reference to the same supply points, making the electronic signal processing circuits simpler.

Figure 6:
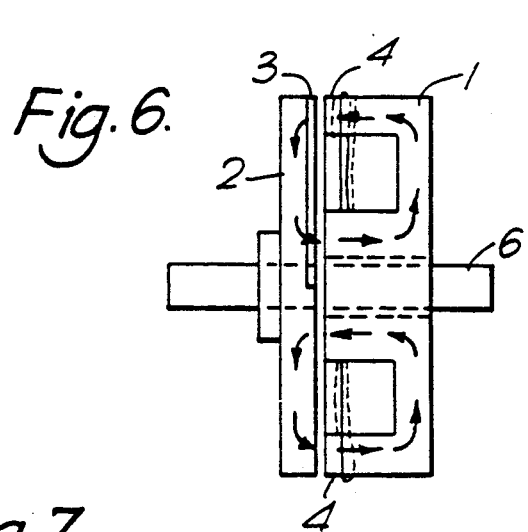
FIG. 6 is a view similar to FIG. 3A but showing a third embodiment in which the rotor and stator are axially adjacent.
Figure 8:
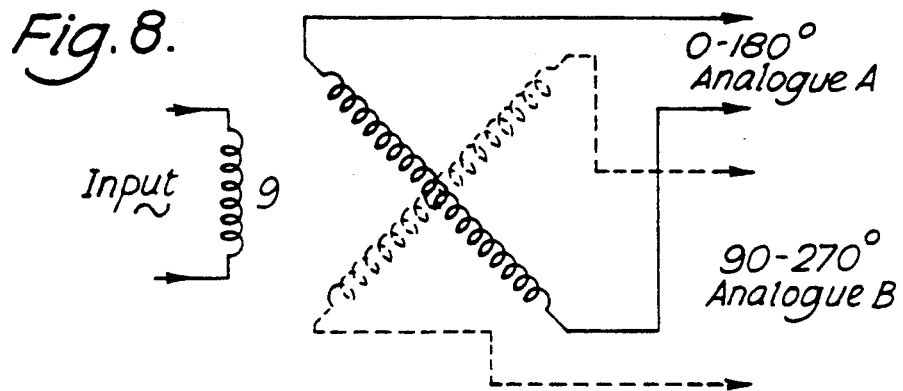
FIG. 8 is a schematic circuit diagram for use with a modification of the first embodiment.

While the construction shown has illustrated the use of a conducting screen to provide 180° assymmetry in effective permeability of the rotor, it will be appreciated that a similar effect may be achieved by using the presence or absence of ferromagnetic material only, e.g. by removing entirely the rotor material in the half shown screened in FIGS. 3A and 3B. It is also possible to make the rotor internal and the stator external, or to produce a design with axially facing stator and rotor as exemplified in FIG. 6, which shows basic elements and shaft only, screen 3 being over 180° of rotor 2 face. A further possibility with the homopolar design is to provide isolation between windings by utilising a double-wound instead of auto-transformer connection. If a coil 9 is wound around the centre of the stator spool 1 of FIGS. 3A and 3B, the supply can be connected to this winding to act as a primary, and angular analogue voltages derived as secondary and/or tertiary windings from either or both of two 180° spans displaced by 90° from the windings across the slots, positioned as for the auto-transformer arrangement already described. This may be of advantage when the electronic circuits used to process the analogue signals can benefit by isolation of the outputs from the supply ground connection. FIG. 8 represents the sensor supply and output connections in this arrangement.

The same homopolar construction can also be adapted to linear motion sensing, as typified in FIGS. 9A, 9B and 9C. Here, stator 11 is of channel section ferromagnetic material, and is faced across a constant air gap by moving element 12, which is screened by a conducting layer 13 for a half-stator length. Slots 14 (or 14, 14′) in the face of one leg of the stator enable half-length (or quarter-length) windings to magnetise the elements in the same relative direction, as indicated by the arrows, with the same auto-transformer connections as described for the rotary embodiment. In the screen position shown, the inductance of winding section a-b will be higher than b-c, but movement to the left will reverse this, the centre tap voltage being a basically linear analogue of half a stator length. Again, including quarter-windings and taps X and Y, together with a longer moving element 15 with two half-length screens spaced by a half-length will enable two analogue outputs displaced by a quarter-length to be derived, and thus produce curves like curves A and B of FIG. 7 again to give an output representing plus/minus half a length, i.e. a whole length of stator.

Again a double-wound form is possible, if a primary winding 16 is provided around the centre limb of the stator as indicated in FIG. 9A.

Another possible use of coil 9 of FIGS. 3A to 3C or coil 16 of FIGS. 9A and 9B is as a nominally fixed secondary output resulting from the auto-transformer connection of the supply across a and c. This fixed value may be used as a reference for the analogue outputs, e.g. by taking the ratio of the analogue output divided by the nominally fixed output of this secondary winding. The ratio should be more independent of supply voltage and frequency variations, and the more expensive electronic processing system then justifiable when extreme accuracies are required.

As compared with the heteropolar devices of WO 88/06716, preferred examples of the first type of embodiment of the present invention may offer the following advantages:

1. Stepless change of output with angle, eliminating the need for skew of the screen;
2. Much simpler winding of the stator—two coils only for up to 180°, four for 360°;
3. Reduction of leads from five to four;
4. Both outputs (curves A and B) derived from a common ground reference, so simplifying electronics;
5. Possibility of a double-wound transformer alternative if supply isolation is required; and
6. Prospect of much easier miniaturisation of the transducer.

While the embodiments described have related in rotary form to shaft angle sensing, for which mechanical balancing of the rotor would be a practical necessity, the same principles can be applied to the construction of inclination or roll sensors. In these cases, the rotor would be deliberately unbalanced to cause its position to relate to gravitational pull relative to the stator, so that deviation of stator position relative to vertical about the rotor axis would cause an output signal proportional to plus/minus 180° to be derived.

Some examples of the second type of embodiment will now be described with reference to FIGS. 10-17.

FIGS. 10A to 10C shows a typical arrangement for angle sensing. Ferromagnetic stator 101 has a ferromagnetic rotor 102 journalled to rotate around it (bearing and shaft arrangements not shown. The construction can also be inverted to bring the stator outside the rotor, as in ordinary electrical machines). The stator periphery is divided into two active poles 103A and 103B, and return pole 104. The actives poles 103 carry windings 105; these poles are of equal size, and the windings 105 are also identical to each other. They are connected in series so that at any instant their polarities are the same; flux developed by these active poles must therefore return via the ferromagnetic rotor 102 and the return pole 104.

The rotor is arranged so that a part of its surface has lower effective permeability than the remainder, e.g. by interposing a conducting screen 106 of copper. The Screen 106 is of length identical to the arc encompassed by one active pole 103. When this screen covers one pole 103A, its winding will have lower inductance than that of the other pole 103B, and consequently there will be a lower voltage drop across it, if the windings are fed with an a.c. at terminals A and C. The voltage between mid-point tap B and C or A will vary with rotation of the screen, between limiting values when either is fully screened, as shown in FIG. 11 for voltage B-C. Note that the limit of travel for nominally linear analogue output is that of one active pole 103; the screen only traverses these poles, as further movement would simply screen the return pole, putting the device outside its useful range.

An alternative rotor construction is exemplified by FIG. 12 in which absence of the ferromagnetic material over a span equal to that of one pole 103 is used to reduce the permeability, and ensuing inductance of the winding coupled to this space in the rotor. Rotor 107 is of circumferential length equal to the sum of the length of the return pole 104 plus one active pole 103, and is made of high permeability material.

Again, rotation is limited to the span of an active pole 103, in such a manner as to keep return pole 104 fully coupled to either of the active poles 103A, 103B.

The maximum angular rotation for linear analogue output is thus equal to half that spanned by the pair of active poles 103. This in turn is limited by the span required for the return pole 104, which is a design variable according to frequency, flux density and ferromagnetic material properties. It can be minimised by eliminating the air-gap between the return pole 104, if the screen 106 only is rotated on shaft 108, as shown in FIGS. 13A and 13B, thus giving a maximum range of about 150°, the pair of poles 103 occupying 300°.

Where high sensitivity over small angular ranges is required, return pole 104 can be bigger and active poles 103 smaller to suit. For ranges of less than about 70°, the system can be doubled up as in FIG. 14, in which there are two pairs of active poles 103 and two return poles 104, or multiplied still further in equivalent sets of three poles when still smaller angular ranges are needed.

When the pair of active poles are connected in series, with the output derived from the centre tap, the arrangement constitutes a brushless rotary variable autotransformer. It is also possible for engineers skilled in the art to devise alternative methods of converting the effective change in inductive reactance into an electrical signal, e.g. by converting change of inductance into change of frequency in an oscillator circuit.

FIG. 15 shows a typical embodiment of this invention in a linear displacement sensor. Again, the return pole 104 can be via the air gap (FIG. 15), or, if the screen only is moved as in FIG. 16, without air-gap. In either case, symmetry of the magnetic circuit suggests that return pole 104 is divided in two halves, one at each end, unless the alternative screenless method of operation is used, in which absence of iron reduces inductance. This is exemplified in FIG. 17, with return pole 104 central between two active poles 103, either of which is coupled to return 104 by the moving ferromagnetic element 107, of length equal to return pole 104 plus one active pole 103.

The winding arrangements described above all enable a single tapped winding in auto-transformer form to provide the analogue output in proportion to displacement. It is also possible to extend the application of the new form of construction to double-wound devices, by the simple expedient of winding a primary on return pole 104. This corresponds to the primary winding on the axis of the first type of embodiment as described above, e.g. with reference to FIG. 9A. The secondary voltages across poles 103A and 103B will then vary with displacement as their coupling is changed by screening, or by the absence of ferromagnetic material as in FIG. 12. If required, the windings on poles 103A and 103B can be in a series opposition, so that the output is that of a differential transformer, with a central null and phase reversal either side.

While the output characteristic shown in FIG. 11 is a straight line, achievment of this ideal may require pole-shaping or other design detail changes to linearise the field distribution along the air-gap.

I claim:

1. An inductive displacement sensor for providing electrical output data relating to displacement of a relatively displaceable portion of the sensor along a path, said sensor comprising first and second elements, which extend along the path on respective sides and confront each other across said path; said first element having a plurality of coil portions disposed along the path and oriented so that their axes of polarity cross the path to the other side; said second element comprising inductance affecting means adapted to affect the inductance of an adjacent coil portion and arranged so that, at any given time, said inductance affecting means extends adjacent only a fraction of the coil portions of the first element so that only the coils of that fraction are affected thereby; and wherein said relatively displaceable portion of the sensor comprises said inductance affecting means which is displaceable relative to said first element, said relative displacement causing the inductance affecting means to extend adjacent a fraction of coil portions which varies with the displacement of the inductance affecting means thereby effectively displacing a region of affected inductance so that the region applied to a spatially varying fraction of the coil portions; characterised in that said coil portions are connected as a homopolar series so that when current is passed through said series so that any one coil portion is polaried N-S from the path side of the first element to the other path side, all of the coil portions have this polarity; and when any one coil portion is polarised S-N, all of the coil portions have this polarity.

2. An inductive displacement sensor according to claim 1 wherein the coil portions constitute a single winding.

3. An inductive displacement sensor according to claim 1 wherein the coil portions are connected in series, constituting a single winding with one or more intermediate taps between coil portions, the array of coil portions being arranged as an autotransformer.

4. An inductive displacement sensor according to claim 1 wherein said second element (2) comprises a ferromagnetic core (2) that effectively extends along the displacement path for only a fraction of the length of path occupied by the plurality of coil portions (ab,bc) so that at any given time it is effectively adjacent only a fraction of the coil portions which are thus in a high inductance condition.

5. An inductive displacement sensor according to claim 4 wherein said core extends along the entire length of the path occupied by the plurality of coil portions (ab,bc) but is rendered ineffectual to produce the high inductance condition over part of its length by a screen (3).

6. An inductive displacement sensor according to claim 1 wherein said second element comprises a ferromagnetic core that extends along the path for substantially the whole length of the path occupied by the plurality of coil portions, and a screen which extends along the path for only a fraction of the length of the path occupied by the plurality of the coil portions so that at any given time it acts to screen only a fraction of the coil portions from the ferromagnetic core; said screen being displaceable relative to said first element along said path and constituting said inductance affecting means.

7. An inductive displacement sensor according to claim 1 in which the first element includes core means (1) extending along said path, said coil portions (ab,bc) being wound on said core means which is shaped to provide along its length a return path for magnetic flux generated by the coil portions (AB,BC).

8. An inductive displacement sensor according to claim 7 wherein the core means of the first element comprises ferromagnetic material defining a spool-shaped flux path, the element having large-diameter axial end portions and an intermediate portion of lesser diameter, with the coil portions wound on one end portion, and a flux return path being provided through the second end portion.

9. An inductive displacement sensor according to claim 7 wherein the displacement path is linear and the core means (11) of the first element comprises ferromagnetic material defining a channel having a base and two arms, with the coil portions (abc) being provided on one arm, and the other arm providing part of the flux return path.

10. An inductive displacement sensor according to claim 1 wherein the displacement path is at least part circular and said first element includes generally cylindrical core means (1a) with slots (4) which extend along its axial length and open in its cylindrical surface; each said coil portion (ab,bc) being wound between a respective pair of said slots.

11. An inductive displacement sensor according to claim 10 having four slots at 90° intervals, and four coil portions.

12. An inductive displacement sensor according to claim 11 wherein each of said four coil portions is wound between a different adjacent pair of said four slots.

13. An inductive displacement sensor according to claim 11 wherein each pair of diametrically opposite slots carries a pair of opposed coil portions (abc,XYZ) wound around respective half-cylinders.

14. An inductive displacement sensor according to claim 1 in which the first element includes core means (103,104) extending along said path, said coil portions being wound on said core means over only a fraction (103A,103B) of its length, the rest of which (104) provides a return path for magnetic flux generated by the coil portions (AB,BC).

15. An inductive displacement sensor according to claim 14 wherein the displacement path is at least part circular and said first element includes generally cylindrical core means (1a) with slots (4) which extend along its axial length opening in its cylindrical surface; each said coil portion (ab,bc) being wound between a respective pair of said slots; a sector of the core means between two slots being left unwound to provide said flux return path.

16. An inductive displacement sensor according to claim 14 wherein the displacement path is linear and the core means (103,104) of the first element comprises ferromagnetic material defining an elongate bar with transverse slots; each said coil portion (ABC) being wound between a respective pair of adjacent slots; a portion (104) of the length of the bar not bearing coil portions and serving to provide part of the flux return path.

17. An inductive displacement sensor according to claim 1, wherein the coil portions are delimited by intermediate taps, and in use, any one of the taps can provide an electrical output which is substantially linear relative to the displacement of the inductance affecting means (3, 13, 106)

* * * * *